(12) United States Patent
Molaire

(10) Patent No.: US 7,579,127 B2
(45) Date of Patent: Aug. 25, 2009

(54) BLOCKED POLYISOCYANATES INCORPORATING PLANAR ELECTRON-DEFICIENT TETRACOBONYLBISIMIDE MOIETIES

(75) Inventor: Michel F. Molaire, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 85 days.

(21) Appl. No.: 11/453,355

(22) Filed: Jun. 15, 2006

(65) Prior Publication Data
US 2007/0292795 A1 Dec. 20, 2007

(51) Int. Cl.
G03G 5/14 (2006.01)
C08C 18/48 (2006.01)

(52) U.S. Cl. .......... 430/64; 525/458; 525/459; 525/440.02

(58) Field of Classification Search .......... 430/60, 430/64; 525/458, 459
See application file for complete search history.

(56) References Cited

U.S. PATENT DOCUMENTS

| | | |
|---|---|---|
| 3,428,451 A | 2/1969 | Trevoy |
| 4,082,551 A | 4/1978 | Steklenski et al. |
| 4,971,873 A | 11/1990 | Pavlisko et al. |
| 5,128,226 A | 7/1992 | Hung |
| 5,246,806 A * | 9/1993 | Koyama et al. ............ 430/59.6 |
| 5,681,677 A | 10/1997 | Bugner et al. |
| 6,294,301 B1 | 9/2001 | Sorriero et al. |
| 6,451,956 B2 | 9/2002 | Sorriero et al. |
| 6,593,046 B2 | 7/2003 | Sorriero et al. |
| 6,866,977 B2 | 3/2005 | Sorriero et al. |
| 2002/0012862 A1* | 1/2002 | Sorriero et al. ............ 430/64 |
| 2005/0123846 A1* | 6/2005 | Kinoshita ............ 430/60 |

FOREIGN PATENT DOCUMENTS

| | | |
|---|---|---|
| JP | 2003-327587 | 11/2003 |
| JP | 2003-330209 | 11/2003 |

OTHER PUBLICATIONS

U.S. Appl. No. 10/888,172, filed Jul. 9, 2004, Molaire, et al.
U.S. Appl. No. 11/192,347, filed Jul. 28, 2005, Ferrar, et al.
U.S. Appl. No. 11/210,100, filed Aug. 19, 2005, Molaire, et al.

* cited by examiner

Primary Examiner—Mark F Huff
Assistant Examiner—Peter L Vajda
(74) Attorney, Agent, or Firm—Carl F. Ruoff; Andrew J. Anderson

(57) ABSTRACT

The present invention is a photoconductive element containing an electrically conductive support, an electrical barrier layer disposed over said electrically conductive support and a charge generation layer capable of generating positive charge carriers when exposed to actinic radiation disposed over the barrier layer. The barrier layer is formed from a blocked polyisocyanate containing tetracarbonylbisimide groups. The present invention also discloses a new composition of a blocked polyisocyanate containing tetracarbonylbisimide groups.

18 Claims, No Drawings

BLOCKED POLYISOCYANATES INCORPORATING PLANAR ELECTRON-DEFICIENT TETRACOBONYLBISIMIDE MOIETIES

CROSS-REFERENCE TO RELATED APPLICATIONS

This application relates to commonly assigned application Ser. No. 11/453,407, now U.S. Pat. Pub. 2007/0292796, filed simultaneously herewith and hereby incorporated by reference for all that it discloses.

FIELD OF THE INVENTION

This invention relates to electrophotography. More particularly, it relates to blocked polyisocynates incorporating electron-deficient tetracarbonylbisimide groups and to photoconductive elements that contain an electrical charge barrier layer having said blocked polyisocyanates.

BACKGROUND OF THE INVENTION

Photoconductive elements useful, for example, in electrophotographic copiers and printers are composed of a conducting support having a photoconductive layer that is insulating in the dark but becomes conductive upon exposure to actinic radiation. To form images, the surface of the element is electrostatically and uniformly charged in the dark and then exposed to a pattern of actinic radiation. In areas where the photoconductive layer is irradiated, mobile charge carriers are generated which migrate to the surface and dissipate the surface charge. This leaves in non-irradiated areas a charge pattern known as a latent electrostatic image. The latent image can be developed, either on the surface on which it is formed or on another surface to which it is transferred, by application of a liquid or dry developer containing finely divided charged toner particles.

Photoconductive elements can comprise single or multiple active layers. Those with multiple active layers (also called multi-active elements) have at least one charge-generation layer and at least one n-type or p-type charge-transport layer. Under actinic radiation, the charge-generation layer generates mobile charge carriers and the charge-transport layer facilitates migration of the charge carriers to the surface of the element, where they dissipate the uniform electrostatic charge and form the latent electrostatic image.

Also useful in photoconductive elements are charge barrier layers, which are formed between the conductive layer and the charge generation layer to restrict undesired injection of charge carriers from the conductive layer. Various polymers are known for use in barrier layers of photoconductive elements. For example, Hung, U.S. Pat. No. 5,128,226 discloses a photoconductor element having an n-type charge transport layer and a barrier layer, the latter comprising a particular vinyl copolymer. Steklenski, et al. U.S. Pat. No. 4,082,551, refers to Trevoy U.S. Pat. No. 3,428,451, as disclosing a two-layer system that includes cellulose nitrate as an electrical barrier. Bugner et al. U.S. Pat. No. 5,681,677, discloses photoconductive elements having a barrier layer comprising certain polyester ionomers. Pavlisko et al, U.S. Pat. No. 4,971,873, discloses solvent-soluble polyimides as polymeric binders for photoconductor element layers, including charge transport layers and barrier layers.

Still further, a number of known barrier layer materials function satisfactorily only when coated in thin layers. As a consequence, irregularities in the coating surface, such as bumps or skips, can alter the electric field across the surface. This in turn can cause irregularities in the quality of images produced with the photoconductive element. One such image defect is caused by dielectric breakdowns due to film surface irregularities and/or non-uniform thickness. This defect is observed as toner density in areas where development should not occur, also known as breakdown.

The known barrier layer materials have certain drawbacks, especially when used with negatively charged elements having p-type charge transport layers. Such elements are referred to as p-type photoconductors. Thus, a negative surface charge on the photoconductive element requires the barrier material to provide a high-energy barrier to the injection of positive charges (also known as holes) and to transport electrons under an applied electric field. Many known barrier layer materials are not sufficiently resistant to the injection of positive charges from the conductive support of the photoconductive element. Also, for many known barrier materials the mechanism of charge transport is ionic. This property allows for a relatively thick barrier layer for previously known barrier materials, and provides acceptable electrical properties at moderate to high relative humidity (RH) levels. Ambient humidity affects the water content of the barrier material and, hence, its ionic charge transport mechanism. Thus, at low RH levels the ability to transport charge in such materials decreases and negatively impacts film electrical properties. A need exists for charge barrier materials that transport charge by electronic as well as ionic mechanisms so that films are not substantially affected by humidity changes.

Condensation polymers of polyester-co-imides, polyesterionomer-co-imides, and polyamide-co-imides are all addressed in:

1. Sorriero et al. in U.S. Pat. No. 6,294,301.
2. Sorriero et al. in U.S. Pat. No. 6,451,956.
3. Sorriero et al. in U.S. Pat. No. 6,593,046.
4. Sorriero et al. in U.S. Pat. No. 6,866,977.
5. Molaire et al. in U.S. patent application Ser. No. 10/888,172.

These polymers have as a repeating unit a planar, electron-deficient, tetracarbonylbisimide group that is in the polymer backbone. The polymers are either soluble in chlorinated solvents and chlorinated solvent-alcohol combinations, or they contain salts to achieve solubility in polar solvents. In all cases, care must be taken not to disrupt the layer with subsequent layers that are coated from solvents, as this may result in swelling of the electron transport layer, mixing with the layer, or dissolution of part or all of the polymer. Furthermore, salts can make the layer subject to unwanted ionic transport.

Japanese Kokai Tokkyo Koho 2003330209A to Canon includes polymerizable naphthalene bisimides among a number of polymerizable electron transport molecules. Some of the naphthalene bisimides contain acrylate functional groups, epoxy groups, and hydroxyl groups. The monomers are polymerized after they are coated onto an electrically conductive substrate. However this approach does not ensure the full incorporation of all of the monomers. Some of the functional groups would not react to form a film and could thus be extracted during the deposition of subsequent layers. This would result in a layer that was not the same composition as deposited before polymerization. Further, it would allow for the unwanted incorporation of the electron transport agent into the upper layers of the photoreceptor by contamination of the coating solutions. Thus the need remains for a well-characterized electron transport polymer that can be coated and crosslinked completely to produce a layer that will transport electrons between layers of a photoreceptor without contaminating subsequent layers.

Japanese Kokai Tokkyo Koho 2003327587A to Canon describes the synthesis of naphthalene bisimide acrylate polymers. The polymers were coated from solution onto "aluminum Mylar" and irradiated with an electron beam to harden the layer to form crack free films. Mobility measurements were made. The need exists to form an insoluble film from a polymer that can transport electrons and has active sites for crosslinking that result in a film that can be overcoated with subsequent layers to form a photoreceptor. The crosslinking should be done either thermally or with UV light.

Photoconductive elements typically are multi-layered structures wherein each layer, when it is coated or otherwise formed on a substrate, needs to have structural integrity and desirably a capacity to resist attack when a subsequent layer is coated on top of it or otherwise formed thereon. Such layers are typically solvent coated using a solution with a desired coating material dissolved or dispersed therein. This method requires that each layer of the element, as such layer is formed, should be capable of resisting attack by the coating solvent employed in the next coating step. A need exists for a negatively chargeable photoconductive element having a p-type photoconductor, and including an electrical barrier layer that can be coated from an aqueous or organic medium, that has good resistance to the injection of positive charges, can be sufficiently thick and uniform that minor surface irregularities do not substantially alter the field strength, and resists hole transport over a wide humidity range. Still further, a need exists for photoconductive elements wherein the barrier layer is substantially impervious to, or insoluble in, solvents used for coating other layers, e.g., charge generation layers, over the barrier layer.

Accordingly, a need exists for a negatively chargeable photoconductive element having a p-type photoconductor, and including an electrical barrier layer that can be coated from an aqueous or organic medium, that has good resistance to the injection of positive charges, can be sufficiently thick and uniform that minor surface irregularities do not substantially alter the field strength, and resists hole transport over a wide humidity range. Still further, a need exists for photoconductive elements wherein the barrier layer is substantially impervious to, or insoluble in, solvents used for coating other layers, e.g., charge generation layers, over the barrier layer.

In U.S. patent application Ser. No. 11/210,100, Molaire, et al. and U.S. patent application Ser. No. 11/192,347, Ferrar, et al. the use of bisimide polyols and malonate-blocked isocyanate as crosslinkable materials is disclosed. In these disclosures polyols incorporating tetracarbonylbisimide moieties are cross-linked with blocked polyisocyanates that are available commercially. We have however shown that the preferred barrier layer polymers incorporate a high concentration of the tetracarbonylbisimide moiety. Two drawbacks of this approach are:

The polymers with the high concentration of the tetracarbonylbisimide tend to be less soluble in common solvent;

To maximize the tetracarbonylbisimide content of the formulation, the hydroxy content of the polymer has to be minimized to control the percentage of the non-functional blocked isocyanate portion of the formulation.

PROBLEM TO BE SOLVED BY THE INVENTION

A need exists for blocked poly-isocyanates incorporating tetracarbonylbisimide moieties that are soluble in environmentally friendly solvents for use in electrophotographic applications, specially in negatively chargeable photoconductive element having a p-type photoconductor, and including an electrical barrier layer that can be coated from an aqueous or organic medium, that has good resistance to the injection of positive charges, can be sufficiently thick and uniform that minor surface irregularities do not substantially alter the field strength, and resists hole injection and transport over a wide humidity range. That will make the hydroxyl equivalent weight of the preformed tetracarbonylbisimide polyol immaterial, because more functional tetracarbonylbisimide can be provided through the blocked polyisocyanate-containing tetracarbonylbisimide moieties. Still further, a need exists for photoconductive elements wherein the barrier layer is substantially impervious to, or insoluble in, solvents used for coating other layers, e.g., charge generation layers, over the barrier layer.

SUMMARY OF THE INVENTION

The present invention is a photoconductive element containing an electrically conductive support, an electrical barrier layer disposed over said electrically conductive support and a charge generation layer capable of generating positive charge carriers when exposed to actinic radiation disposed over the barrier layer. The barrier layer is formed from a blocked polyisocyanate containing tetracarbonylbisimide groups.

The present invention also discloses a new composition of a blocked polyisocyanate containing tetracarbonylbisimide groups.

DETAILED DESCRIPTION OF THE INVENTION

The present invention relates to a photoconductive element comprising an electrically conductive support, an electrical barrier layer disposed over said electrically conductive support, and disposed over said barrier layer, a charge generation layer capable of generating positive charge carriers when exposed to actinic radiation, said barrier layer comprising blocked polyisocyanates incorporating tetracarbonylbisimide groups and to photoconductive elements that contain an electrical charge barrier layer comprised of said blocked polyisocyanates incorporating tetracarbonylbisimide moieties.

The novel blocked polyisocyanate containing tetracarboxylbisimide can prepared using the methods of U.S. Patent Application 20020165335, or U.S. Pat. Nos. 4,518,522, 4,430,489, 5,574,124, from the reaction of a preformed tetracarbonylbisimide polyol with organic diisocyanates including, ethylene diisocyanate, 1,4-tertamethylene dodecane diisocyanate, cyclobutane-1,3 diisocyanate, hexamethylene diisocyanate, toluene diisocyanate and isophorone diisocyanate etc. and derivatives thereof to make a isocyanate multi-substituted tetracarbonylbisimide. Additionally controlled amount of tri, tetra or higher functionality isocyanates can be added to initiate branching of the blocked isocyanate for optimizing crosslinking density of final coated layers. In a second step the preformed polyisocyanates containing tetracarbonylbisimide is reacted with a blocking agent including malonates (Diethyl malonate, DEM), ketoxime (MEKO), 3,5-dimethylpyrazole (DMP), e-caprolactam using the methods of U.S. Pat. Nos. 6,713,556, 5,232,988, 5,817,732, 6,111, 048, 6,696,539

The novel blocked polyisocyanates containing tetracarbonylbisimide can also prepared using the to monomeric glass mixtures incorporating tetracarbonylbisimide groups described in Ser. No. 11/453,407, now U.S. Pat. Pub. 2007/0292796, filed simultaneously herewith, by the same procedure outlined above. The monomeric glass mixtures of Ser. No. 11/453,407 offer the additional advantage of enhanced solubility and compatibility.

The preformed tetracarbonylbisimide polyols of this invention are prepared according to the technique described in Sorriero et al. in U.S. Pat. No. 5,266,429, the teachings of which are incorporated herein by reference in their entirety. The imide structures in the polyol-imides of the present invention contain aromatic groups $Ar^1$ and optionally $Ar^2$, which can be tetravalent benzene, naphthalene, or perylene nuclei.

Preferred imides are 1,2,4,5-benzenetetracarbonyl-dimides

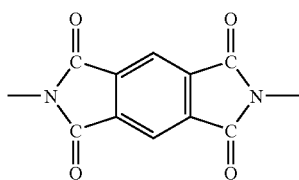

1,4,5,8-naphthalenetetracarbonyl-dimides

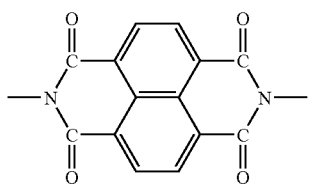

and 3,4,9,10-perylenetetracarbonyl-dimides

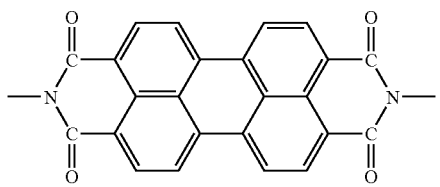

Especially preferred are naphthalenetetracarbonyl-dimides and perylenetetracarbonyl-dimides. In addition to the four carbonyl groups, $Ar^1$ and $Ar^2$ can contain other substituents such as alkyl, alkoxy, halo, and the like.

When $L^1$ and $L^2$ are O, the groups $Z^1$ and $Z^2$ can be aromatic dicarbonyl groups such as isophthaloyl, terephthaloyl, 1,4-naphthalenedicarbonyl, and the like. The aromatic dicarbonyl groups can be further substituted with groups such as alkyl, alkoxy, halo, and the like. $Z^1$ and $Z^2$ can also be aliphatic dicarbonyl groups such as succinoyl, adipoyl, suberoyl, sebacoyl, and the like. The aliphatic groups can be branched, as in octylsuccinoyl, 2,4-dimethylglutaroyl, 3,3-dimethylglutaroyl, and the like. Dicarbonyl groups $Z^1$ and $Z^2$ which are aromatic are preferred. Especially preferred are isophthaloyl, terephthaloyl, and 5-t-butyl-isophthaloyl.

When $L^1$ and $L^2$ are O, Q is an alkylenedioxy group Q having an aliphatic chain connecting the oxygen atoms, for example, ethylenedioxy, 1,3-propylenedioxy, 1,6-hexylenedioxy, and the like. The group can be branched, such as 1,2-propylenedioxy, 1,2-butylenedioxy, and the like, or cyclic, as 1,4-cyclohexanedioxy and the like. The alkylenedioxy group Q can also contain an aromatic nucleus, for example, 1,2-benzenedimethylenoxy and 1,3-benzenedimethylenoxy, or olefinic or acetylenic unsaturation, or a divalent O or S atom. Preferred alkylenedioxy groups are ethylenedioxy and 1,2-propylenedioxy; ethylenedioxy is especially preferred.

When $L^1$ and $L^2$ are C=O, the alkylenedioxy groups $Z^1$ and $Z^2$ can be as described above for Q, and the dicarbonyl group Q can be aromatic or aliphatic as described above for $Z^1$ and $Z^2$, aromatic dicarbonyl groups being preferred.

Alkylene groups $R^1$ and $R^2$ can have straight chains, for example, ethylene, 1,3-propylene, 1,4-butylene, 1,5-pentylene, 1,8-octylene, and the like. The alkylene groups $R^1$ and $R^2$ can also be branched, such as 1,2-propylene, 1,2-butylene, 2-methyl-1,2-propylene, and the like, or cyclic, such as 1,4-cyclohexylidene and the like. $R^1$ and $R^2$ can also contain an aromatic nucleus, or olefinic or acetylenic unsaturation, or a divalent O or S atom. In a preferred embodiment, $R^1$ and $R^2$ are the same. In a more preferred embodiment, $R^1$ and $R^2$ are both pentylene.

When the group Q contains a tetravalent aromatic group $Ar^2$, the alkylene groups $R^3$ and $R^4$ are as described above for $R^1$ and $R^2$. In a preferred embodiment, $R^3$ and $R^4$ are the same.

In particular the aromatic tetracarbonylbisimide groups of the formula:

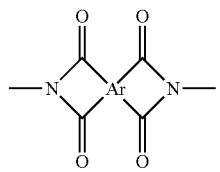

where

Ar is a tetravalent aromatic group having from 6 to 20 carbon atoms and may be the same or different. Representative groups include:

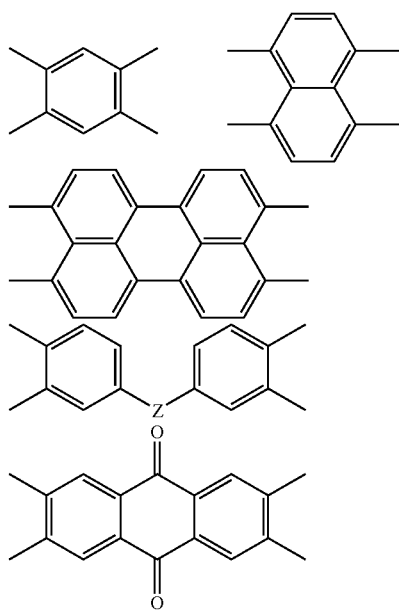

-continued where Z =

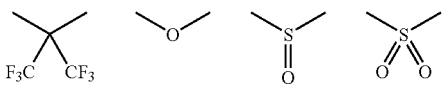

$R^1$, $R^2$, $R^3$, and $R^4$=alkylene and may be the same or different. Representative alkylene moieties include 1,3-propylene, 1,5-pentanediyl and 1,10-decanediyl.

$R^5$=alkylene or arylene. Representative moieties include 1,4-cyclohexylene, 1,2-propylene, 1,4-phenylene, 1,3-phenylene, 5-t-butyl-1,3-phenylene, 2,6-naphthalene, vinylene, 1,1,3-trimethyl-3-(4-phenylene)-5-indanyl, 1,1 2-dodecanediyl, and the like.

$R^6$=alkylene such as ethylene, 2,2-dimethyl-1,3-propylene, 1,2-propylene, 1,3-propylene, 1,4-butanediyl, 1,6-hexanediyl, 1,10-decanediyl, 1,4-cyclohexanedimethylene, 2,2'-oxydiethylene, polyoxyethylene, tetraoxyethylene, and the like, or hydroxyl substituted alkylene such as 2-hydroxymethyl-1,3-propanediyl, 2-hydroxymethyl-2-ethyl-1,3-propanediyl, 2,2-bis(hydroxymethyl)-1,3-propanediyl, and the like.

3,4,9,10-perylenetetracarboxylic-bisimides:

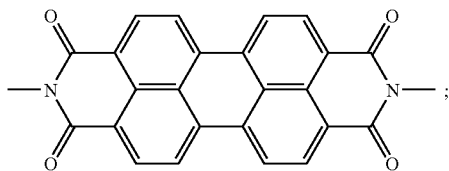

2,3,6,7-anthraquinonetetracarboxylic-bisimides:

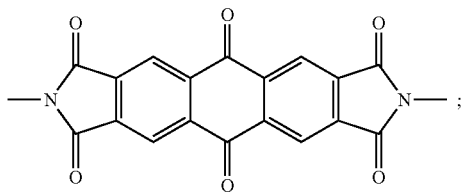

and hexafluoroisopropylidene-2,2',3,3'-benzenetetracarboxylic-bisimides:

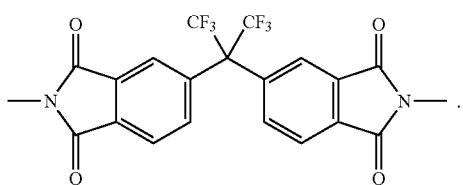

Reacting either a mixture of bis-anhydride incorporating the tetravalent aromatic groups above with an amino-alcohol, or a mixture of amino alcohols with a bis-anhydride, or reacting a mixture of amino-alcohols with a mixture of bis-anydrides obtains the monomeric glass mixtures.

The more complex the mixture, the more difficult crystallization, the more soluble the resulting material. On the other hand it is preferable to keep the mixture as simple as possible to facilitate characterization, for quality control purpose. The more unsymmetrical the amino-alcohols, the more soluble the resulting glass mixtures. Examples of amino-alcohol include 2-amino-2-methyl-propanol, 1-amino-2propanol, 2(2-Aminoethoxy) Ethanol, 2-amino-1-butanol, 5-amino-1-pentanol, 4-aminophenol, 4-amino-m-cresol, ethanolamine, propanolamine, 5-amino-1-pentanol.

The polyols incorporating tetravalent aromatic groups of this invention can be made using the same reaction procedure described in Sorriero et al. in U.S. Pat. No. 6,294,301, Sorriero et al. in U.S. Pat. No. 6,451,956, Sorriero et al. in U.S. Pat. No. 6,593,046, and Sorriero et al. in U.S. Pat. No. 6,866,977.

The invention provides for blocked polyisocyanates incorporating bisimide with tetravalent aromatic groups that are easily soluble in environmentally friendly solvents, such as alcohol, ketone, water or combination thereof. These blocked polyisocyanates can be formulated into crosslinkable formulation for electrophotographic applications. In particular, these materials can be used to provide a negatively chargeable photoconductive element having a p-type photoconductor, and including an electrical barrier polymer that has good resistance to the injection of positive charges, can be sufficiently thick and uniform that minor surface irregularities do not substantially alter the field strength, and resists hole transport over a wide humidity range. The barrier polymer is prepared from a blocked polyisocyanate having planar, electron-deficient, tetracarbonylbisimide groups and soluble in environmentally friendly solvents. The barrier material is rendered substantially impervious to, or insoluble in, solvents used for coating other layers, e.g., charge generation layers, over the barrier layer by using crosslinking reaction such as urethane, epoxy, phenolic, and other crosslinking chemistries.

EXAMPLES

Preparation 1

Monomeric Glass Mixture of 1,4,5,8-Naphtalenetetracarboxilic Dianhydride

A mixture of 1,4,5,8-naphthalenetetracarboxylic dianhydride (80.37 g; 0.30 mole), 2-(2-aminoethoxy) ethanol (16.56 g; 0.1575 mole), 1-amino-2-propanol (11.83 g; 0.1575 mole), 2-amino-1-butanol (14.04 g; 0.1575 mole), 2-amino-2-methyl-1-propanol (14.04 g; 0.1575 mole) and 4-picoline (350 mL) was refluxed for 4 hr, cooled to room temperature and diluted with methanol (350 mL).

The mixture was very soluble, and very difficult to isolate.

The picoline solvent was neutralized with concentrated hydrochloric acid. An amorphous solid precipitated out. The solid was collected, dissolved in dichloromethane and reprecipitated into isopar G., filtered and collected. The equation described in M. F. Molaire and Roger Johnson in "Organic Monomeric Glasses: A Novel Class of Materials," Journal Polymer Science, Part A, Polymer Chemistry, Vol. 27, 2569-2592 (1989). Was used to calculate the expected composition of the mixture.

$$N\,(r{=}2){=}\{n!/(2!(n-1)!\}S1{+}nS2$$

Number of expected compounds in the mixture=[4!/(2!(4−2)!]S1+4S2

Since S1 and S2=1

Number of expected compounds in the mixture=6+4=10

The isolated sample was submitted for HPLC analysis; the following compounds were identified,

| Compound | MW | Area Percent | R1 | R2 |
|---|---|---|---|---|
| 1 | 442 | 12.8 | 2-ethoxyethanol | 2-ethoxyethanol |
| 2 | 412 | 33.7 | 2-ethoxyethanol | 2-propanol |
| 3 | 382 | 28 | 2-propanol | 2-propanol |
| 4 | 396 | 0.4 | 2-propanol | 1-butanol or 2-methyl--propanol |
| 5 | 426 | 3.1 | 2-ethoxyethanol | 1-butanol or 2-methyl--propanol |
| 6 | 396 | 9.1 | 2-propanol | 1-butanol or 2-methyl--propanol |
| 7 | 410 | 410 | 1-butanol or 2-methyl--propanol | 1-butanol or 2-methyl--propanol |

The average molecular wt of the glass mixture was estimated at 395.72. A hydroxyl equivalent wt of 276.5 was estimated for the mixture.

Preparation 2

Preparation of Naphthalene Bisimide Terminated By Isocyanate Groups

Toluene diisocyanate (TDI) type I obtained from Lyondell, a mixture of 2,4 isomer (78.8%) and the 2,6 isomer (20.2%) with a molecular weight of 174.16 (hydroxyl equivalent wt of 87.08 (6.0 gram) was dissolved in 40 ml of ethyl acetate in a three-neck round bottomed flask. The mixture was magnetically stirred and brought to reflux (70 C). The monomeric glass mixture of preparation1 (9.09 g; Av. MW: 395; hydroxyl equivalent weight: 197.5) was dissolved in 90 g of Dioxolane and added to the refluxing mixture over a period of one hour. The mixture was further refluxed for three hours. The resulting solution was titrated for NCO content (1.35 meq/g). With the equivalent Wt ratio of starting TDI to starting bisimide idol monomeric mixture of 1.5 to 1.0, a theoretical concentration of OCN was calculated at 1.47 meq/g.

Preparation 3

Preparation of Dimetylpyrazole Blocked Polyisocyanates Incorporating Two Bisimide Diols 1,4,5,8-naphtalene tetracarbonyl-bis (2-hydroxyethoxyethyl) imide, (formula weight: 442 g; hydroxy equivalent weight: 221) 5.4 g and 1,4,5,8-naphtalenetetracarbonyl-bis (5-hydroxypentyl) imide (formula weight: 438 g; hydroxy equivalent weight: 219 g), 5.60 g were dispersed in 100 g of 1,1,2-trichloroethane at room temperature, in a 3-necked round-bottomed flask, mounted with a condenser. The mixture was magnetically stirred and 0.1 g of dibutyl tin dilaurate catalyst added.

Toluene diisocyanate obtained from Lyondell chemistry as an isomeric mixture (79.8% 2,4 isomer and 20.2 2.6 isomer, formula weight: 174.16; isocyanate equivalent weight: 87.08 g ) 3.27 g and isophorone diisocyanate from Rhodia (formula weight: 222.28; isocyanate equivalent weight: 111.14) 2.8 g were dissolved in 50 g of 1,1,2-trichloroethane, in a dropping funnel. The solution was slowly added to the stirred slurry in the flask over about 15 minutes. The equivalent ratio of the material in the mixture was 1:1.5 diols:diisocyanate.

The flask was heated near reflux. After about 15 to 20 minutes, the mixture was a complete deep amber solution.

The source of heat was removed. Once the temperature reached room temperature, 2.4 g of dimethyl Pyrazole (formula weight: 96.13 g were added to the stirred amber solution. The stirring was continued overnight. The next morning, a sample of the amber solution was dried at about 100° C. in a Blue M oven. The amorphous sample was analyzed by DSC, TGA, IR and GPC.

The TGA, and DSC suggest a deblocking temperature of about 120° C. DSC shows a glass transition temperature of 24.6° C. before deblocking, and a Tg of 105.6° C. after deblocking. The GPC shows a weight average molecular weight of 5,900, and a number average molecular weight of 1,630. The IR shows a trace amount of unblocked isocyanate group. The dark amber glassy material was also soluble in dioxolane.

Preparation 4

Preparation of Dimetylpyrazole Blocked Polyisocyanates Incorporating One Bisimide Diol The procedure of example 1 was repeated, except that only 1,4,5,8-naphtalenetetracarbonyl-bis(5-hydroxypentyl) imide was used alone, and mixed with the same mixture of isocyanate, in the same equivalent weight ratio as example 1. The mixture became an amber solution in the same timeframe as example 1. However, the next morning the amber solution solidifies looking as a solid gel mass. The flask was warmed up. The material returned to a fluid amber solution. Upon cooling again a solidified amber mass returned. A sample of that gel looking material was dried and analyzed by DSC, and TGA.

The TGA and DSC suggest a deblocking temperature of about 120° C. DSC shows a glass transition temperature of 65.9° C. before deblocking, and a Tg of 93.2° C. after deblocking. The IR shows a trace amount of unblocked isocyanate group. The dark amber solid was not soluble in Dioxolane.

The invention has been described in detail with particular reference to certain preferred embodiments thereof, but it will be understood that variations and modifications can be effected within the spirit and scope of the invention.

The invention claimed is:

1. A photoconductive element comprising an electrically conductive support, an electrical barrier layer disposed over said electrically conductive support, a charge generation layer capable of generating positive charge carriers when exposed to actinic radiation disposed over said barrier layer, said barrier layer formed from a blocked polyisocyanate containing tetracarbonylbisimide groups.

2. The photoconductive element of claim 1 wherein the tetracarbonylbisimide groups comprise:

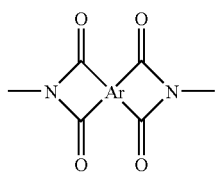

where
Ar is a tetravalent aromatic group having from 6 to 20 carbon atoms and may be the same or different.

3. The photoconductive element of claim 1 wherein the blocked polyisocyanate is formed from the reaction of a preformed tetratcabonylbisimide polyol with an organic isocyanate to form a polyisocyanate, and reaction of the polyisocyanate with a blocking agent.

4. The photoconductive element of claim 3 wherein the organic isocyanate is selected from the group consisting of ethylene diisocyanate, 1,4-tertamethylene dodecane diisocyanate, cyclobutane-1, 3 diisocyanate, hexatnethylene diisocyanate, toluene diisocyanate, isophorone diisocyanate and derivatives thereof.

5. The photoconductive element of claim 3 wherein the blocking agent is selected from the group consisting of malonates, ketoxime, 3,5-dimethylpyrazole and e-caprolactam.

6. The photoconductive element of claim 3 wherein the preformed tetratcabonylbisimide polyol comprises an imide selected from the group consisting of 1,2,4,5-benzenetetracarbonyl-dimides,

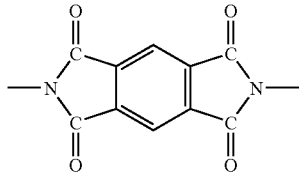

1,4,5,8-naphthalenetetracarbonyl-dimides

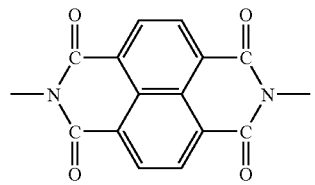

and 3,4,9,10-perylenetetracarbonyl-dimides

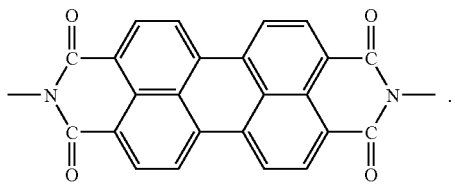

7. A composition comprising a blocked polyisocyanate containing tetracarbonylbisimide groups.

8. The composition of claim 7 wherein the tetracarbonylbisimide groups comprise:

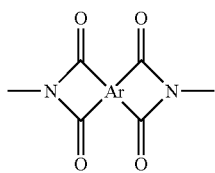

where
Ar is a tetravalent aromatic group having from 6 to 20 carbon atoms and may be the same or different.

9. The composition of claim 7 wherein the blocked polyisocyanate is formed from the reaction of a preformed tetratcabonylbisimide polyol with an organic isocyanate to form a polyisocyanate, and reaction of the polyisocyanate with a blocking agent.

10. The composition of claim 9 wherein the organic isocyanate is selected from the group consisting of ethylene diisocyanate, 1,4-tertamethylene dodecane diisocyanate, cyclobutane-1, 3 diisocyanate, hexamethylene diisocyanate, toluene diisocyanate, isophorone diisocyanate and derivatives thereof.

11. The composition of claim 9 wherein the blocking agent is selected from the group consisting of malonates, ketoxime, 3,5-dimethylpyrazole and e-caprolactam.

12. The composition of claim 9 wherein the preformed tetratcabonylbisimide polyol comprises an imide selected from the group consisting of 1,2,4,5-benzenetetracarbonyl-dimides,

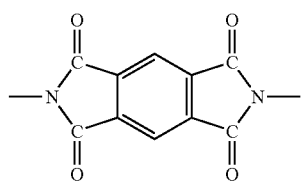

1,4,5,8-naphthalenetetracarbonyl-dimides

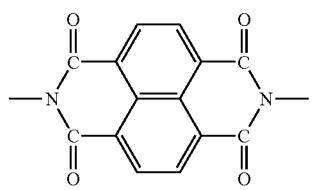

and 3,4,9,10-perylenetetracarbonyl-dimides

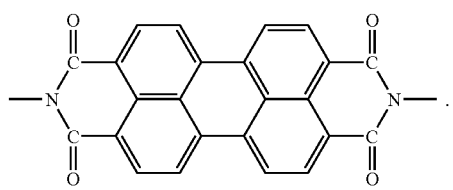

13. A blocked polyisocyanate containing tetracarbonylbisimide groups.

14. The blocked polyisocyanate of claim 13 wherein the tetracarbonylbisimide groups comprise:

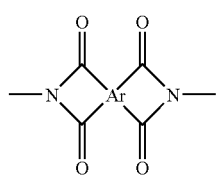

where
Ar is a tetravalent aromatic group having from 6 to 20 carbon atoms and may be the same or different.

15. The blocked polyisocyanate of claim 13 wherein the blocked polyisocyanate is formed from the reaction of a preformed tetratcabonylbisintde polyol with an organic isocyanate to form a polyisocyanate, and reaction of the polyisocyanate with a blocking agent.

16. The blocked polyisocyanate of claim 15 wherein the organic isocyanate is selected from the group consisting of ethylene diisocyanate, 1,4-tertamethylene dodecane diisocyanate, cyclobutane-1, 3 diisocyanate, hexamethylene dilsocyanate, toluene diisocyanate, isophorone diisocyanate and derivatives thereof.

17. The blocked polyisocyanate of claim 15 wherein the blocking agent is selected from the group consisting of malonates, ketoxime, 3,5-dimethylpyrazole and e-caprolactam.

18. The blocked polyisocyanate of claim 15 wherein the preformed tetratcabonylbisimide polyol comprises an imide selected from the group consisting of 1,2,4,5-benzenetetracarbonyl-dimides,

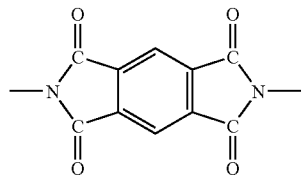

1,4,5,8-naphthalenetetracarbonyl-dimides

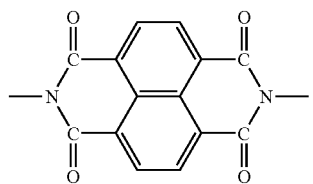

and 3,4,9,10-perylenetetracarbonyl-dimides

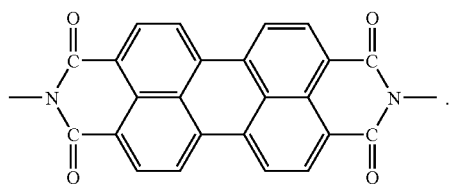

* * * * *

UNITED STATES PATENT AND TRADEMARK OFFICE
CERTIFICATE OF CORRECTION

PATENT NO.       : 7,579,127 B2
APPLICATION NO.  : 11/453355
DATED            : August 25, 2009
INVENTOR(S)      : Molaire It is certified that error appears in the above-identified patent and that said Letters Patent is hereby corrected as shown below:

Cover Page (54) Title, delete "TETRACOBONYLBISIMIDE" and insert -- TETRACARBONYLBISIMIDE --.

Column 1, line 4, delete "TETRACOBONYLBISIMIDE" and insert -- TETRACARBONYLBISIMIDE --.

Column 10, line 67, Claim 3, delete "tetratcabonylbisimide" and insert -- tetracarbonylbisimide --.

Column 11, line 5, Claim 4, delete "1,4-tertamethylene" and insert -- 1,4-tetramethylene --.

Column 11, line 6, Claim 4, delete "hexatnethylene" and insert -- hexamethylene --.

Column 11, line 13, Claim 6, delete "tetratcabonylbisimide" and insert -- tetracarbonylbisimide --.

Column 12, line 1, Claim 10, delete "1,4-tertamethylene" and insert -- 1,4-tetramethylene --.

Column 12, line 65, Claim 15, delete "tetratcabonylbisintde" and insert -- tetracarbonylbisimide --.

Column 13, line 3, Claim 16, delete "1,4-tertamethylene" and insert -- 1,4-tetramethylene --.

Column 13, lines 4 and 5, Claim 16, delete "dilsocyanate" and insert -- diisocyanate --.

UNITED STATES PATENT AND TRADEMARK OFFICE
CERTIFICATE OF CORRECTION

PATENT NO. : 7,579,127 B2
APPLICATION NO. : 11/453355
DATED : August 25, 2009
INVENTOR(S) : Molaire It is certified that error appears in the above-identified patent and that said Letters Patent is hereby corrected as shown below:

Column 13, line 12, Claim 18, delete "tetratcabonylbisimide" and insert -- tetracarbonylbisimide --.

Signed and Sealed this

Twenty-fourth Day of November, 2009

David J. Kappos
*Director of the United States Patent and Trademark Office*